US 8,958,008 B2

(12) United States Patent
Kudo (10) Patent No.: US 8,958,008 B2
(45) Date of Patent: Feb. 17, 2015

(54) CAMERA AND METERING METHOD FOR CAMERA

(75) Inventor: Yasunori Kudo, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 679 days.

(21) Appl. No.: 12/907,686

(22) Filed: Oct. 19, 2010

(65) Prior Publication Data

US 2011/0122310 A1    May 26, 2011

(30) Foreign Application Priority Data

Nov. 20, 2009   (JP) ................................ 2009-265551

(51) Int. Cl.
| | |
|---|---|
| H04N 5/232 | (2006.01) |
| H04N 5/238 | (2006.01) |
| G03B 13/00 | (2006.01) |
| H04N 5/235 | (2006.01) |
| G02B 7/08 | (2006.01) |
| G03B 7/28 | (2006.01) |
| G03B 13/36 | (2006.01) |

(52) U.S. Cl.
CPC ................ H04N 5/2351 (2013.01); G02B 7/08 (2013.01); G03B 7/28 (2013.01); G03B 13/36 (2013.01); H04N 5/23212 (2013.01)
USPC ............... 348/349; 348/364; 396/89

(58) Field of Classification Search
USPC ............ 348/333.02, 333.12, 348, 349, 352, 348/363, 364
See application file for complete search history.

(56) References Cited

U.S. PATENT DOCUMENTS

2008/0018777 A1 *   1/2008   Higashino .................... 348/353
2008/0240700 A1 *   10/2008  Takagi ............................ 396/98

FOREIGN PATENT DOCUMENTS

| JP | 02-125575 | 5/1990 |
|---|---|---|
| JP | 2005-215206 | 8/2005 |
| JP | 2006-325067 | 11/2006 |
| JP | 2010-258654 | 11/2010 |
| WO | WO 2009057510 A1 * | 5/2009 |

OTHER PUBLICATIONS

Office Action for Japanese Patent Application No. 2009-265551, mailed Sep. 10, 2013 (3 pgs.) with translation (3 pgs.).

* cited by examiner

Primary Examiner — Twyler Haskins
Assistant Examiner — Carramah J Quiett
(74) Attorney, Agent, or Firm — John C. Pokotylo; Straub & Pokotylo (57) ABSTRACT

A camera includes: a taking lens forming an image of a subject; an image pickup unit; a subject brightness acquisition unit acquiring the brightness information of the subject on the basis of the output of the image pickup unit; a control unit controlling the exposure according to the brightness information acquired by the subject brightness acquisition unit; and a storage unit storing the information indicating the optical state of the taking lens before the subject brightness acquisition unit acquires the brightness information. The control unit determines whether or not the brightness information is acquired again by the subject brightness acquisition unit according to the information about the optical state of the taking lens stored in the storage unit when the subject brightness acquisition unit previously acquired the brightness information, and the information about the optical state of the taking lens when the latest brightness information is acquired.

12 Claims, 10 Drawing Sheets

CAMERA AND METERING METHOD FOR CAMERA

CROSS-REFERENCE TO RELATED APPLICATIONS

This application is based upon and claims the benefit of priority from prior Japanese Patent Application No. 2009-265551, filed Nov. 20, 2009, the entire contents of which are incorporated herein by reference.

FIELD OF THE INVENTION

The present invention relates to a camera and a metering method for the camera.

DESCRIPTION OF THE RELATED ART

The distribution of the metering value resulting from a camera metering of the brightness of a subject using the light through a taking lens depends on the focusing state of the subject during the metering. When the metering is performed in a largely out-of-focus state, the image taking surface receives an image in a diffused state in which the image is not sufficiently formed, thereby generating uniform brightness, and causing erroneous determination in metering by dividing a subject field area and considerably losing a dividing effect.

In particular, a camera having a large image pickup device or image circle, or a bright lens having a small f-stop, has a small subject field depth. Therefore, the out-of-focus level becomes high and causes a serious technical problem.

With respect to the above-mentioned technical problem, patent document 1 discloses technology based on the autofocus mechanism provided in addition to the image pickup device and the configuration for image metering performed using the image pickup device in order to perform preliminary metering in a predetermined charging time before an autofocusing operation, and to perform re-metering in a newly set charging time after the autofocusing operation. If the metering is performed again after the autofocusing operation, in which the focusing state of a taking lens is determined, the metering can be performed in the focusing state in the shooting operation. Therefore, the brightness of a subject can be calculated using an appropriate value.

[Patent Document 1] Japanese Laid-open Patent Publication No. 2-125575

SUMMARY OF THE INVENTION

When a release button functioning as a switch for shooting a subject is pressed, autofocus (AF) and automatic exposure (AE) are performed to determine the focusing state and the exposure for shooting an image, but performing re-metering after the autofocusing is successfully performed causes a technical problem wherein a release time lag, which is the time taken after the release button is pressed until an image is actually shot, is lengthened by the time taken for the re-metering.

The present invention aims to reduce the time taken for the metering process of a camera for performing metering and autofocusing the output of an image pickup device, and to shorten the release time lag.

The present invention provides a camera having: a taking lens for forming an image from the light of a subject; an image pickup unit for converting the image formed by the taking lens into an electric signal; a subject brightness acquisition unit for acquiring the brightness information of the subject on the basis of the output of the image pickup unit; a control unit for controlling the exposure according to the brightness information acquired by the subject brightness acquisition unit; and a storage unit for storing the information indicating the optical state of the taking lens before the subject brightness acquisition unit acquires the brightness information.

The control unit determines whether or not the brightness information has been acquired again via the subject brightness acquisition unit in accordance with the information about the optical state of the taking lens stored in the storage unit when the subject brightness acquisition unit previously acquired the brightness information and the information about the optical state of the taking lens when the latest brightness information is acquired.

According to the present invention, a camera for performing metering and autofocusing the output of an image pickup device can reduce the time required for a metering process, and shorten the release time lag.

DESCRIPTION OF THE PREFERRED EMBODIMENT

According to the first aspect of the embodiments of the present invention, whether or not the metering is to be performed again after an autofocusing operation is finished is determined on the basis of the information about the amount of change in image forming position of a taking lens and the stop during the metering, thereby suppressing as much as possible the execution of re-metering so as to shorten the release time lag during the re-metering.

According to the second aspect, it is determined from the image forming position and the f-stop when the previous metering was performed whether the previous metering value is to be used in determining the exposure when a shooting operation is performed, or whether re-metering is to be performed. Use of re-metering is suppressed as much as possible so that the release time lag caused by the re-metering can be shortened.

According to the third aspect, use of re-metering is suppressed as much as possible so that the release time lag caused by re-metering can be shortened, by determining whether or not re-metering is to be performed at the completion of scan driving after defining the autofocusing operation as having three periods, initial position driving, scan driving, and focus driving.

In the case of the third aspect, if the determination can be made as to whether or not re-metering is required before the focus driving, then the preparations for the re-metering (for example, setting an f-stop) can be made concurrently with the focus driving, thereby shortening the time required to perform the re-metering.

According to the fourth aspect, re-metering after the completion of the autofocusing can be eliminated by using the metering value of the intermittent metering performed concurrently while driving a lens for the autofocusing. That is, while driving a lens for the autofocusing, in most cases an diaphragm is fully open or the exposure is inappropriate other than at a distance measuring area. However, metering can be continuously performed while driving a lens, depending on the conditions, and the metering value is adopted at the focusing position, thereby avoiding the need for re-metering.

However, the high-speed frame rate becomes predominant during the autofocusing, and the arithmetic load becomes higher in each frame metering operation. Therefore, intermittent metering is performed in the fourth aspect, in which the metering is performed when the amount of movement of an image forming surface, that is, the amount of change in an image forming position, exceeds a predetermined amount.

According to each aspect of the embodiments of the present invention, the metering accuracy can be maintained, the time required to perform the metering process can be reduced, and the release time lag can be shortened.

The embodiments of the present invention are described below in detail with reference to the attached drawings.

Embodiment 1

Figure 1:
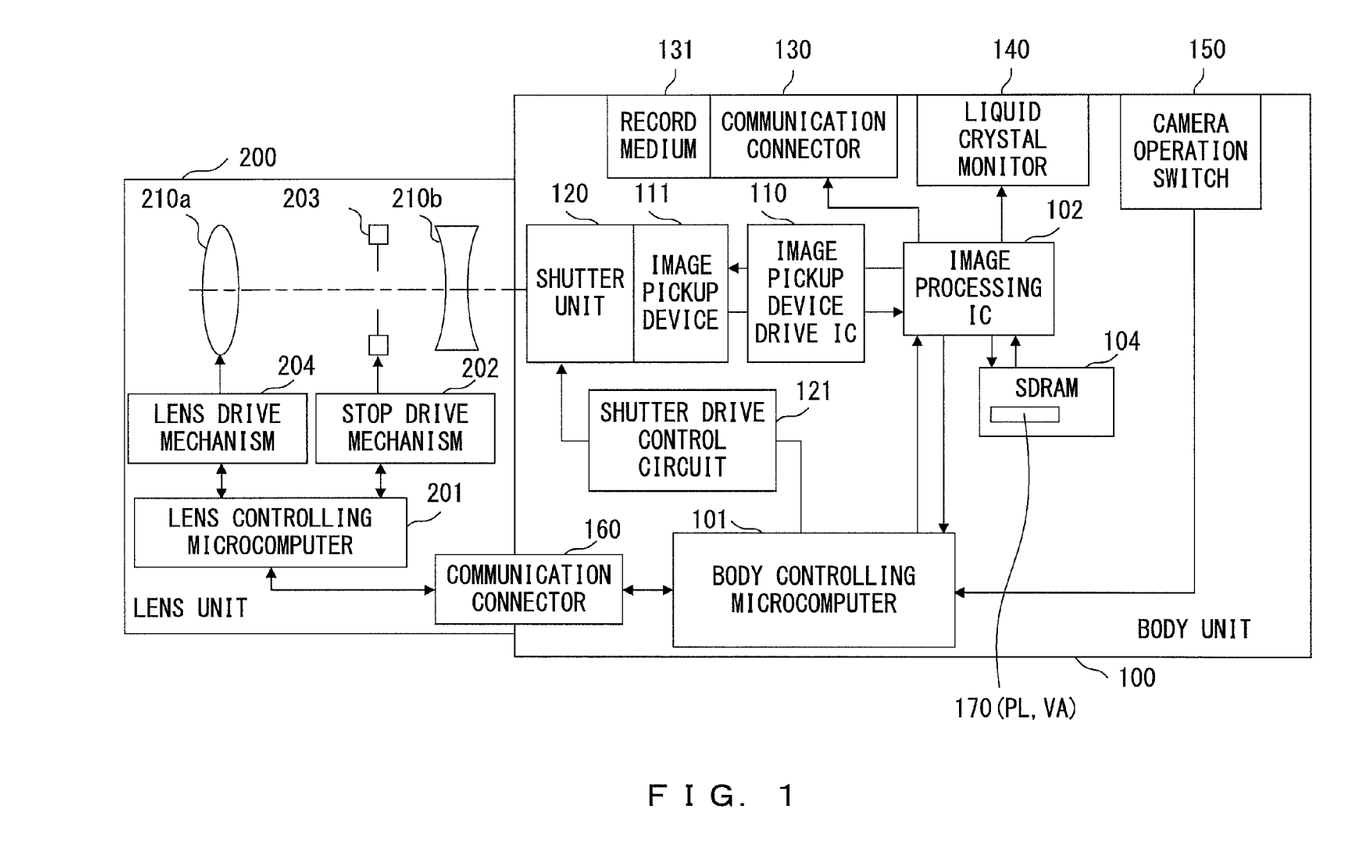
FIG. 1 is a conceptual view of an example of the configuration of the camera according to an embodiment of the present invention.

FIG. 1 is a conceptual view of an example of the configuration of the camera according to an embodiment of the present invention.

Figure 2:
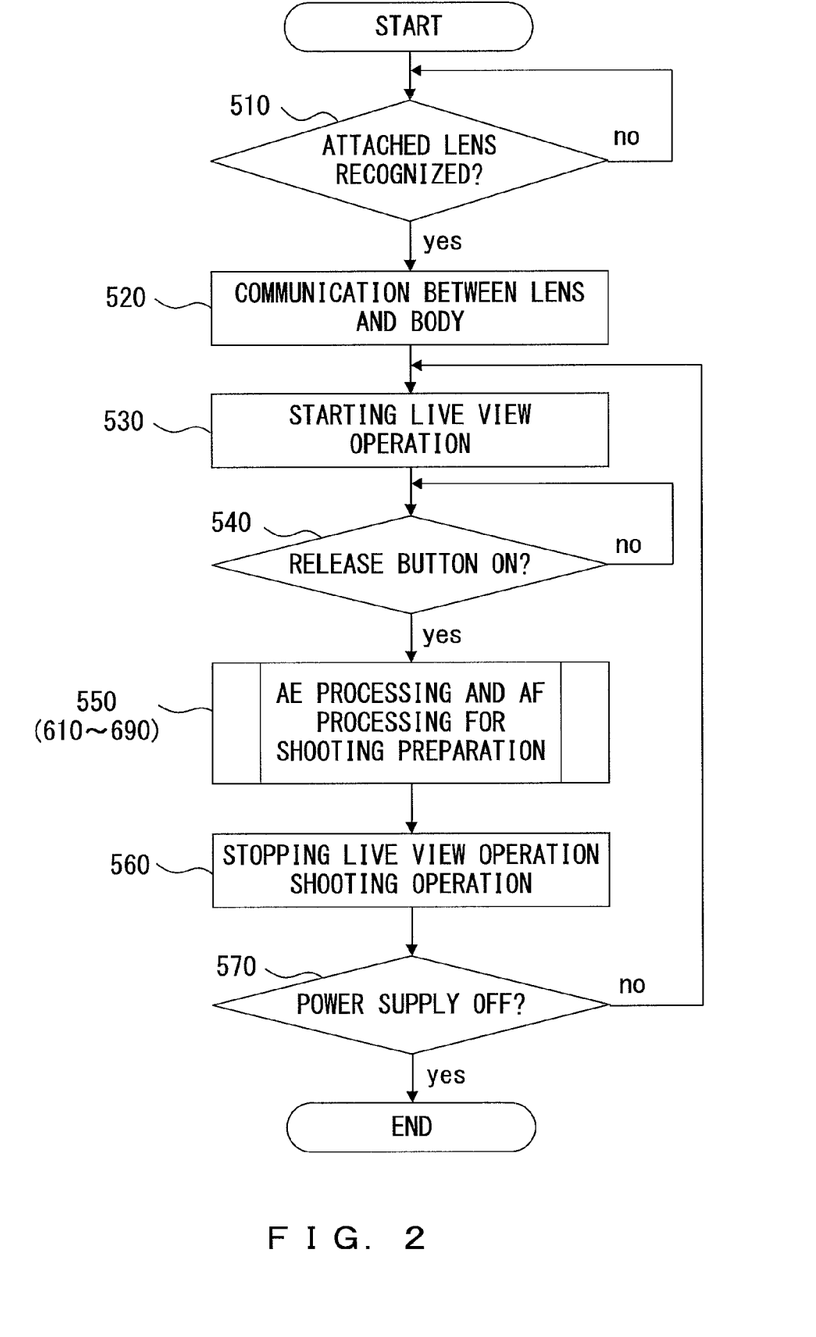
FIG. 2 is a flowchart of an example of the effect of the camera according to an embodiment of the present invention.

FIG. 2 is a flowchart of an example of the effect of the camera according to an embodiment of the present invention.

First, with reference to FIG. 1, the configuration of the camera according to the present embodiment is described below.

As exemplified in FIG. 1, the camera according to the present embodiment is, for example, a single-lens reflex camera, and includes a body unit 100, an exchangeable lens unit (that is, a lens barrel) 200, and a record medium 131 for storing data of a captured image.

The record medium 131 is connected to the body unit 100 through a communication connector 130.

The lens unit 200 is detachable and attachable through a lens mount not illustrated in the attached drawings, but provided on the front surface of the body unit 100, and exchangeable with respect to the camera according to the present embodiment.

The lens unit 200 is configured with a taking lens 210a, a taking lens 210b, a stop 203, a lens drive mechanism 204 (focus adjustment unit), a stop drive mechanism 202, and a microcomputer for controlling a lens (hereinafter referred to as an L μ com) 201.

The L μ com 201 controls the driving of each of the units in the lens unit 200, for example the lens drive mechanism 204, the stop drive mechanism 202, etc. The focus adjusting optical system configuring a part of the taking lenses 210a and 210b is driven in the optical axis direction by the DC motor not illustrated in the attached drawings but provided in the lens drive mechanism 204.

The lens drive mechanism 204 includes the function of outputting the position of the focus adjusting optical system in the optical axis direction as a lens position information PL (optical state) to the L μ com 201.

The stop 203 is driven by a stepping motor not illustrated in the attached drawings but provided in the stop drive mechanism 202. The L μ com 201 controls the stop drive mechanism 202, sets the aperture of the stop 203, converts the aperture of the stop 203 into an F value, and stores the value as an f-stop VA (optical state).

In addition, the L μ com 201 is electrically connected to a body controlling microcomputer 101 described later through a communication connector 160, can communicate various data with the body controlling microcomputer 101, and can be controlled by the body controlling microcomputer 101. The L μ com 201 transmits as necessary the lens position information PL and an F value as the f-stop VA to the body controlling microcomputer 101.

On the other hand, the body unit 100 in the camera according to the present embodiment is configured as follows.

The body unit 100 is provided with a shutter unit 120 and an image pickup device 111 (image pickup unit) so that they can be positioned on the optical axis of the lens unit 200 attached to the body unit 100.

The luminous flux from the subject, not illustrated in the attached drawings, passes through the taking lenses 210a and 210b and the stop 203 and the shutter unit 120 of a focal plane type on the optical axis, and enters the image pickup device 111 for photoelectric conversion of a subject image.

The luminous flux that has passed the taking lenses 210a and 210b is formed as an image by the image pickup device 111. The image pickup device 111 is controlled for photoelectric conversion by an image pickup device drive IC 110.

The image pickup device 111 performs a photoelectric conversion and converts a subject image formed by the image forming optical system of the lens unit 200 attached to the camera into an analog electric signal. The electric signal is converted by the image pickup device drive IC 110 into a digital electric signal for processing by an image processing IC 102 (subject brightness acquisition unit), and is converted into an image signal by the image processing IC 102.

In addition, the body unit 100 includes the image pickup device 111, the image pickup device drive IC, SDRAM (synchronous dynamic random access memory) 104 provided as a storage area, the liquid crystal monitor 140, and the record medium 131 through the communication connector 130. The components are connected to the image processing IC 102 for image processing, and are configured to provide electronic recording and displaying functions together with an electronic image pickup function.

In the case of the present embodiment, an optical state information storage unit 170 (storage unit) is provided in a part of the storage area of the SDRAM 104. The optical state information storage unit 170 stores a lens position information PL and an f-stop VA obtained from the lens unit 200, and is used to control the judgment of need for re-metering described later.

The record medium 131 is an external record medium such as a semiconductor memory card, an external hard disk drive (HDD), etc., and is attached as a medium that can be exchanged and can communicate with the body unit 100 through the communication connector 130.

The image processing IC 102 is connected to a body controlling microcomputer (hereinafter referred to as a B μ com) 101 for control of each unit in the body unit 100, and performs a process at an instruction of the B μ com 101 (control unit).

The B μ com 101 is connected to the communication connector 160, the shutter drive control circuit 121, etc., and is also connected to a liquid crystal monitor 140 for reporting notifications to a shooter by displaying and outputting an operation state of a camera, a camera operation switch (SW) 150, and a power supply not illustrated in the attached drawings.

The shutter drive control circuit 121 controls the movement of the front shutter and the back shutter of the shutter unit 120 but is not illustrated in the attached drawings, and communicates with the B μ com 101 via a signal for control of the opening/closing operation of a shutter and a signal to be issued when the operation of the front shutter is completed.

The liquid crystal monitor 140 is for notifying a user (shooter) of the operation state of a camera via display and output.

In the present embodiment, the liquid crystal monitor 140 is also used for a live view (hereinafter referred to as an LV as necessary) for displaying an image of a subject S captured by the image pickup device 111 in real time.

The camera operation switch 150 is also configured with a switch group including necessary operation buttons (operation units) for a user operating a camera such as a release switch for specifying the execution of a shooting operation, a mode change switch for switching between a shooting mode, a continuous shooting mode, a normal shooting mode, etc., a power switch for switching on and off the power supply, and the like.

In the camera according to the present embodiment, the release switch is configured with, for example, a first release R1 and a second release R2, that is, the release switch has a 2-stage configuration. The preparation for a shooting operation such as an autofocus operation or the like is started with the first release R1 half pressed, and the actual shooting process is performed with the second release R2 fully pressed.

In addition to the above-mentioned configuration, the body unit 100 is also provided with a power supply circuit not illustrated in the attached drawings, and a power supply mechanism for converting a battery voltage as a power supply, not illustrated in the attached drawings, into a voltage required by each circuit unit of the camera, and supplying the voltage.

A "shooting operation" and "live view operation" by a camera according to the present embodiment are described next.

"Shooting Operation"

First, the B μ com 101 controls the image processing IC 102, and, from the image pickup device 111, the image data is input to the image processing IC 102 through to the image pickup device drive IC 110. Then, the image processing IC 102 stores the image data in the SDRAM 104 as temporary storage memory.

The SDRAM 104 is also used as a work area for image processing by the image processing IC 102.

The image processing IC 102 performs the image processing for converting the image data into an image format of standard specification JPEG data or the like and stores the result in the record medium 131.

Upon receipt of a signal for drive-controlling the shutter from the B μ com 101, the shutter drive control circuit 121 controls the shutter unit 120 so as to perform the opening/closing operation of the shutter.

In this case, the shooting operation is completed by performing predetermined image processing on the image data output from the image pickup device 111 and the image pickup device drive IC 110, and storing the result in the record medium 131.

"Live View Operation"

The luminous flux from the taking lenses 210*a* and 210*b* is led to the image pickup device 111. For example, continuous exposure is performed at a rate of about 30 frames per second, and the image data output from the image pickup device 111 through the image pickup device drive IC 110 is converted into a video signal by the image processing IC 102 and is supplied to the liquid crystal monitor 140, thereby displaying moving pictures of a subject on the liquid crystal monitor 140 in real time.

The display is well known as a "live view". When the live view display of the image data on the liquid crystal monitor 140 is performed on the camera, a user can operate the mode change switch in the camera operation switch 150, and selects the live view mode.

During the live view operation, the luminous flux from the taking lenses 210*a* and 210*b* is usually led to the image pickup device 111. Therefore, the metering process for measuring the brightness of a subject and the well-known autofocusing process for bringing a subject into focus can be performed by the image processing IC 102 on the basis of the image data output from the image pickup device 111 and the image pickup device drive IC 110.

Hereafter, the metering process for measuring the brightness of a subject, and the well-known autofocusing process for bringing a subject into focus and the distance measuring process and autofocusing process on the subject to be performed by the image processing IC 102 and the B μ com 101 on the basis of the image data output from the image pickup device 111 through to the image pickup device drive IC 110 are respectively referred to as "metering" and "AF".

That is, the camera according to the present embodiment is an image metering system and an image autofocus system in which the image pickup device 111 is used in metering and autofocusing.

An example of a basic operation of the camera according to the present embodiment is described below with reference to FIG. 2.

In step 510, when the body unit 100 is powered up, or the lens unit 200 is connected, the next step 520 is performed if the body unit recognizes that the lens unit 200 is connected.

In step 520, information is communicated between the lens unit 200 and the body unit 100. Between the body unit 100 and the lens unit 200, a vertical synchronous signal of the image pickup device 111 is transmitted from the body unit 100 to the lens unit 200 through the communication connector 160.

The specifications of a lens such as the maximum and minimum f-stops, the focal distance, and the like, and the information about the current lens state, the distance of a subject (lens position), and the like are transmitted from the lens unit 200 to the B μ com 101.

In step 530, the above-mentioned "live view operation" is started. During the live view operation, the stop, the shutter speed, and the sensitivity are controlled so as to maintain the appropriate amount of exposure depending on the change in brightness of the subject S.

In step 540, whether or not the first release R1 of the release switch button is turned on is monitored. If the first release R1 is turned on, control is passed to step 550.

In step 550, the autofocus (AF) process and the automatic exposure (AE) process are performed as a preparation for shooting. That is, the metering process is performed to calculate the exposure depending on the brightness of a subject, and the AF process for bringing a subject into focus by driving the lens unit 200 is performed, thereby determining the exposure and the focusing state for shooting accompanied by the record of an image.

With the camera according to the present embodiment, the release time lag from the preparing process of the first release R1 to the actual shooting by the second release R2 is shortened in step 550 as described later.

In step 560, the above-mentioned "live view operation" is stopped, and the above-mentioned "shooting operation" is performed when the second release R2 of the release switch is turned on.

In step 570, unless the power supply is OFF, control is returned to step 530, and the "live view operation" is resumed. If the power supply is OFF, the operation of the camera is terminated.

Next, the process in step 550 is described in more detail.

In the present embodiment, the amount of change in image forming position is used as a control parameter, and the principle of obtaining the amount of change in image forming position is described below with reference to FIG. 3.

Figure 3:
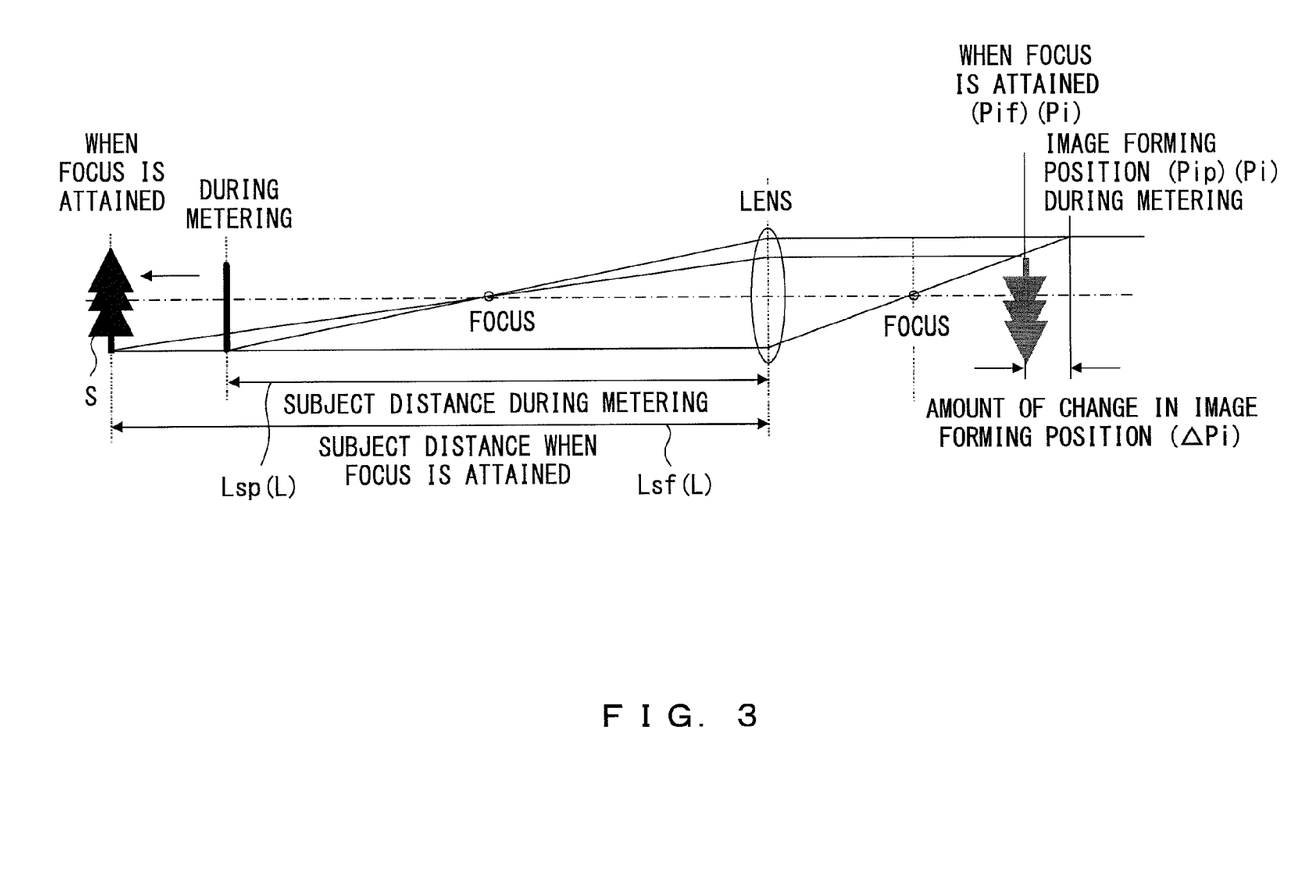
FIG. 3 is a conceptual view of an example of the relationship between the image forming position and the distance from a subject with the camera according to an embodiment of the present invention.

FIG. 3 is a conceptual view of an example of the relationship between the image forming position and the distance from a subject with the camera according to the present embodiment.

The image forming position Pi in which an image is formed can be simply calculated uniquely on the basis of the three characteristics of the taking lenses 210a and 210b, that is, "the beams of light entering parallel to the lens optical axis condense at the focus", "the light in the center of a lens passes straight through", and "the light entering a lens through the focus exits the lens parallel to the lens optical axis".

Since the image forming position Pi changes due to the driving of the lens in the AF operation as illustrated in the attached drawing, an image in focus can be obtained if the image forming position Pi is set on the image taking surface of the image pickup device 111.

That is, as exemplified in FIG. 3, when the distance L of a subject changes from the subject distance Lsp to the distance Lsf of a subject, the image forming position Pi changes from the image forming position Pip to the image forming position Pif.

As illustrated in FIG. 3, the amount of change in image forming position ΔPi indicating the amount of change in image forming position Pi is equivalent to the amount of change in distance L of a subject. As is well known, since the distance L of a subject corresponds to the lens position (lens position information PL), the amount of change in image forming position ΔPi can be obtained from the amount of change in distance L of a subject, that is, the amount of change in lens position.

Therefore, the amount of change in lens position is obtained from the lens position information PL, and is multiplied by the conversion coefficient depending on the optical characteristic of a taking lens, thereby obtaining the amount of change in image forming position ΔPi.

The conversion coefficient depends on the optical conditions of a taking lens, and is stored in the memory not illustrated in the attached drawings, but is provided in the lens unit 200, and is transmitted by the L μ com 201 to the B μ com 101 in the data communications.

The B μ com 101 can calculate the amount of change in image forming position ΔPi based on the amount of change in lens position and the conversion coefficient.

In step 530 in the flowchart illustrated in FIG. 2, the metering operation is performed in a predetermined period immediately after the start of the LV operation.

Since it is necessary to continuously display the image pickup output on the screen of the liquid crystal monitor 140 in the LV operation, the metering is to be started so that the exposure of the image pickup output can be appropriate. Then, when the release button (first release R1) is pressed in step 540, the process in step 550 is performed.

Figure 4:
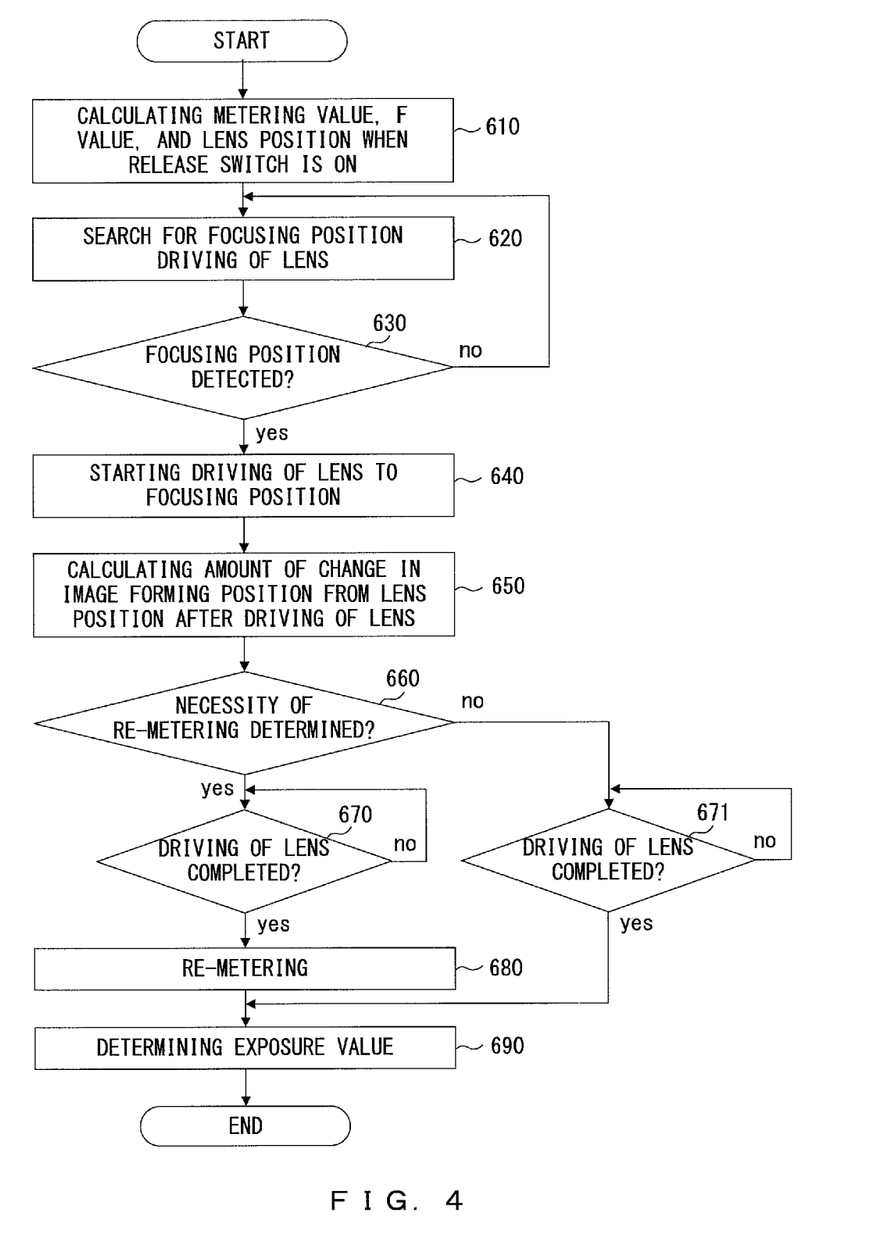
FIG. 4 is a flowchart of a further detailed example of the effect of the camera according to an embodiment of the present invention.

FIG. 4 is a flowchart of a further detailed example of the effect of the camera according to the present embodiment.

The details of step 550 are described below with reference to the flowchart in FIG. 4.

In step 610, the B μ com 101 calculates the metering value when the release switch is ON, the F value of a lens (f-stop VA in this case), and the lens position (lens position information PL), and stores the values in the optical state information storage unit 170.

In step 620, the AF in the LV operation is generally performed by the contrast AF to detect the peak of the contrast in the image pickup output image while driving the lens.

Figure 5:
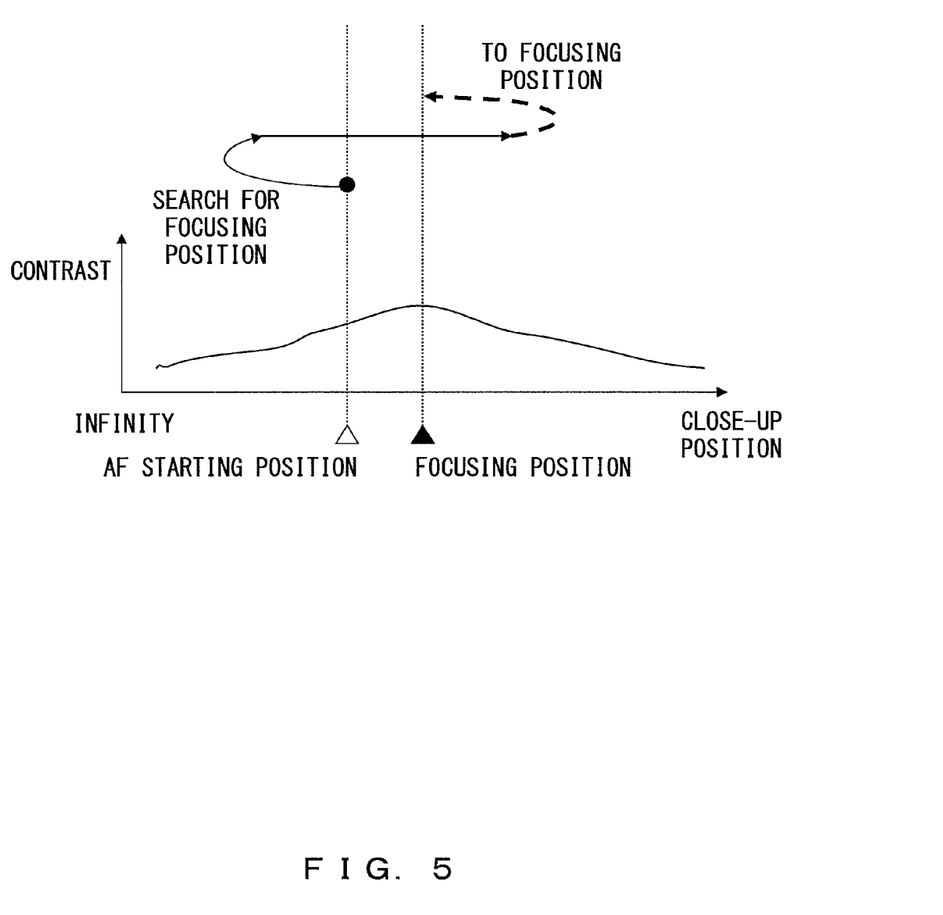
FIG. 5 is a diagram of the relationship between the lens position and the contrast when the autofocusing is performed.

FIG. 5 is a diagram of the relationship between the lens position and the contrast when the AF is performed.

In FIG. 5, the horizontal axis indicates the position of a lens with the closest position at the rightmost portion of the figure and the infinite distance position at the leftmost portion of the figure. The vertical axis indicates the contrast of a partial area (AF area) of the acquired image.

When the contrast of an image changes by driving a lens, it is determined that the highest contrast (hereinafter referred to as a contrast peak) indicates the focusing position of the area.

The AF operation is started, and the lenses (taking lenses 210a and 210b) are driven while checking the contrast on the basis of the output of the image pickup device 111 so as to search for a focusing position. This operation is referred to as a focusing position search.

In step 630, when a contrast peak is detected from the change in lens position and contrast, control is passed to the next step 640. If no peak is detected, control is returned to step 620.

In step 640, the lens position has passed the contrast peak. Then, an operation of returning the lens position to the position at which the contrast peak was detected (hereinafter referred to as a focusing position) in step 630 is performed.

In the case of the present embodiment, the process in step 650 can be concurrently performed when the driving of a lens to the focusing position is started because the determination as to whether or not the re-metering is to be performed can be made without waiting for the completion of the driving of a lens to the focusing position.

In step 650, since the lens position immediately before the shooting operation is determined, the lens position is stored.

Then, the difference between the lens position stored in step 610 and the current lens position is calculated, thereby obtaining the amount of change in lens position. Furthermore, the amount of change in lens position is multiplied by the conversion coefficient depending on the optical characteristic of the taking lens, thus calculating the amount of change in image forming position ΔPi.

In step 660, the absolute value of the amount of change in image forming position ΔPi indicates a large value, and if the image forming position has largely changed, then there is a strong possibility that the focusing state of the subject has largely changed or that the out-of-focus state has occurred.

Therefore, it is necessary to perform a re-metering operation to obtain a correct metering value.

Using as a determination criterion a relative difference in the amount of change in image forming positions ΔPi obtained from the lens position in steps 610 and 650, a determination of an out-of-focus state can be made even though an absolute focusing state is not known.

A situation can arise in which the focusing state is less appropriate in the focusing state (image forming position Pif during focusing) than during metering (image forming position Pip during metering). However, in the present embodiment, it is assumed that the shot image does not indicate an unnatural appearance if the metering can be performed in the same focusing state as in the shooting operation.

Since the out-of-focus level largely depends on the f-stop (f-stop VA), the frequency of the re-metering can be lower by considering the f-stop.

The larger the stop is, the lower the depth of the subject field becomes. Therefore, in the present embodiment, for example the threshold PTH for determination of the need for re-metering relating to the amount of change in image forming position ΔPi is set as PTH=f-stop during metering×determination coefficient. The larger the stop is, the smaller f-stop becomes.

If the absolute value of the amount of change in image forming position ΔPi is equal to or larger than the threshold PTH (ΔPi≥PTH), control is passed to step 670.

If the absolute value of ΔPi is smaller than the threshold PTH (ΔPi<PTH), it is fixed that the metering value used in the exposure calculation in the shooting operation is a metering value calculated when the first release R1 is ON in step 610, and control is passed to step 690 after step 671 (after the completion of the driving of a lens, as in step 670 described later).

In step 670, it is determined whether or not the driving of a lens has been completed. That is, although the driving of a lens is concurrently started toward the focusing position in the AF operation from step 640 described above, control is passed to the re-metering process in step 680 after the completion of the driving of a lens to the focusing position if the driving of a lens is still being performed in the stage in step 670.

In step 680, the re-metering is performed at the focusing position immediately before the shooting operation. The metering value obtained in step 610 is discarded.

In step 690, the exposure value as the shutter speed, the f-stop, and the sensitivity are calculated and determined from the metering value obtained in the re-metering in step 680 or the metering value obtained in the metering in step 610.

Figure 6:
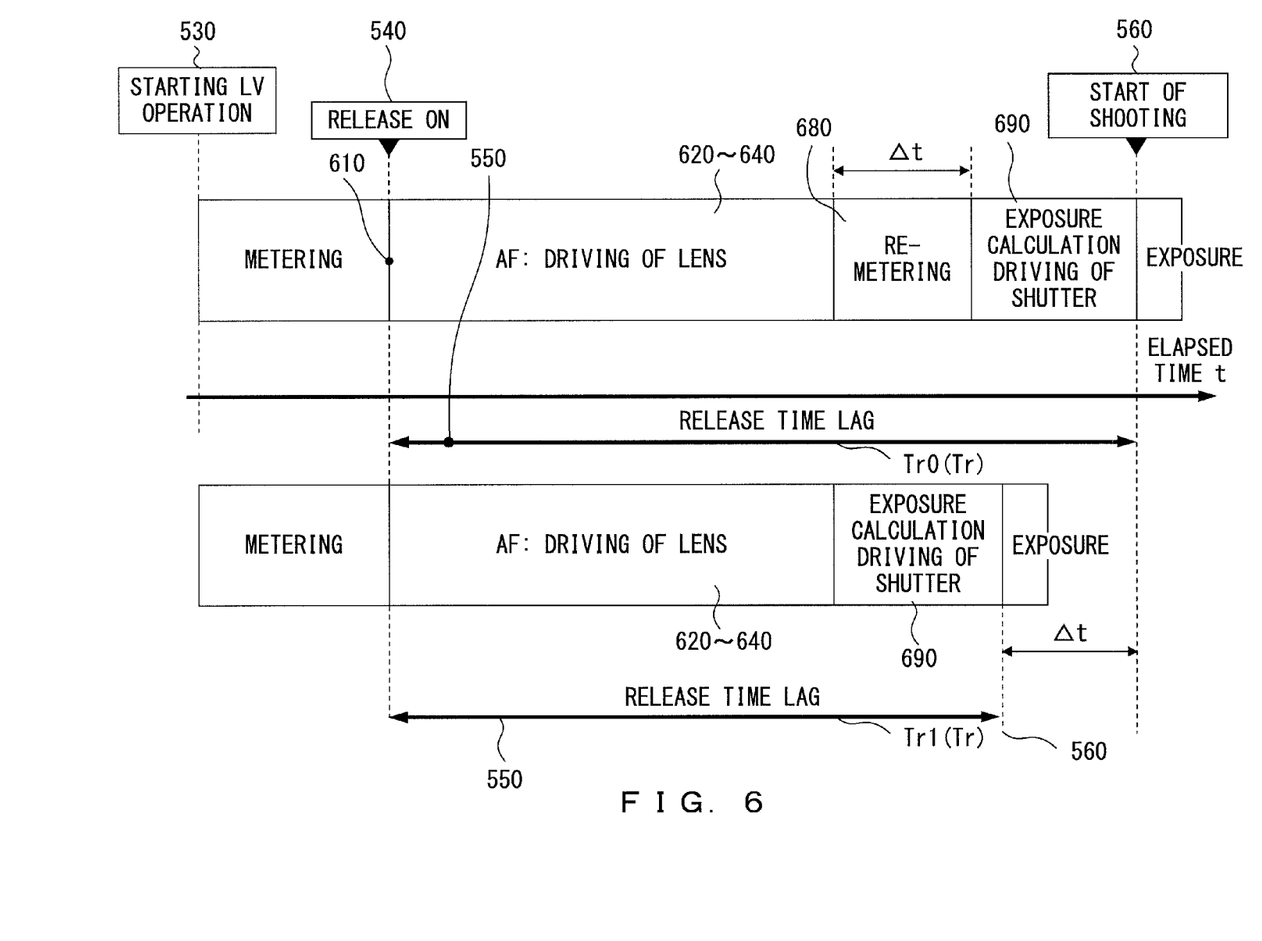
FIG. 6 is a timing chart of an example of the effect of the camera according to an embodiment of the present invention.

Each operation in the process in FIGS. 2 and 4 is described as a timing chart in FIG. 6 for explaining the sequence and the operation.

FIG. 6 is a timing chart of an example of the effect of the camera according to the present embodiment.

In FIG. 6, the step numbers in FIGS. 2 and 4 are described correspondingly.

As described with reference to the flowchart in FIG. 4, the metering is performed from the start of the LV. When the release switch (first release R1) is turned on, the driving of a lens is performed for the AF.

In the prior art, after the completion of the driving of a lens to the focusing position, re-metering is performed at the focusing position, and the exposing operation is performed in the shooting operation after the calculation of the exposure.

On the other hand, in the camera according to the present embodiment, when the release (first release R1) is turned on as in step 610, the metering value at that time is stored and the need for re-metering is determined in accordance with the amount of change in image forming position ΔPi concurrent with the driving of a lens of the AF. If it is determined that it is not necessary to perform re-metering, then re-metering after the driving of a lens is omitted, and the shooting (exposing) is performed immediately when the second release R2 is turned on.

Therefore, when the release time lag Tr from the pressing of the first release R1 to the state in which the shooting can be performed by the pressing of the second release R2 is compared with reference to FIG. 6, the release time lag Tr0 is always necessary in the prior art, but the release time lag Tr can be shortened by the time Δt for the re-metering, for example to the release time lag Tr1 in the present embodiment.

As is well known, the release time lag Tr is one of the indexes indicating a camera capable of shooting an image without losing a good scene. That is, the shorter the lag, the shorter the delay time from the operation of the release switch (first release R1 and second release R2) to the start of the actual shooting operation (that is, the camera is quick in response to the release switch), and the better the camera.

Therefore, the release time lag Tr1 of the camera according to the present embodiment is shorter by Δt in the re-metering than the release time lag Tr0 of the prior art. Accordingly, the performance of the camera can be improved.

In addition, the arithmetic process of the re-metering is omitted, and the process load and the operating power in the process circuit, such as the B μ com 101, can be reduced.

Embodiment 2

Next, embodiment 2 of the present invention is described. The configuration of a camera as a precondition is similar to that in embodiment 1, but the controlling operation for metering and the like is different.

In an example of embodiment 1, metering is not performed during the driving of a lens for an autofocusing operation.

The reasons are that the metering value can be unstable because the lens position constantly changes, the method of determining the optimum exposure based on the exposure during shooting for performing the AF operation may be inappropriate, and the AF arithmetic operation is prioritized by stopping the metering operation during the AF operation, thereby causing a number of problems and a situation in which metering cannot be performed during the driving of a lens for the AF operation.

However, there is a condition under which the metering can be performed during the AF operation. If the conditions permit, the metering operation after the completion of the driving of a lens, that is, the re-metering in FIG. 6, can be omitted by metering during the driving of a lens by the AF.

The technical problem in this case is to correctly acquire the metering value during the driving of a lens without wasteful arithmetic operations.

In embodiment 2, the case in which the re-metering is omitted and the release time lag Tr is shortened is exemplified by correctly performing the metering without wasteful operations even during the driving of a lens by the AF.

Hereinafter, the metering repeatedly performed concurrently with the driving of a lens by the AF is referred to as intermittent metering.

Figure 7:
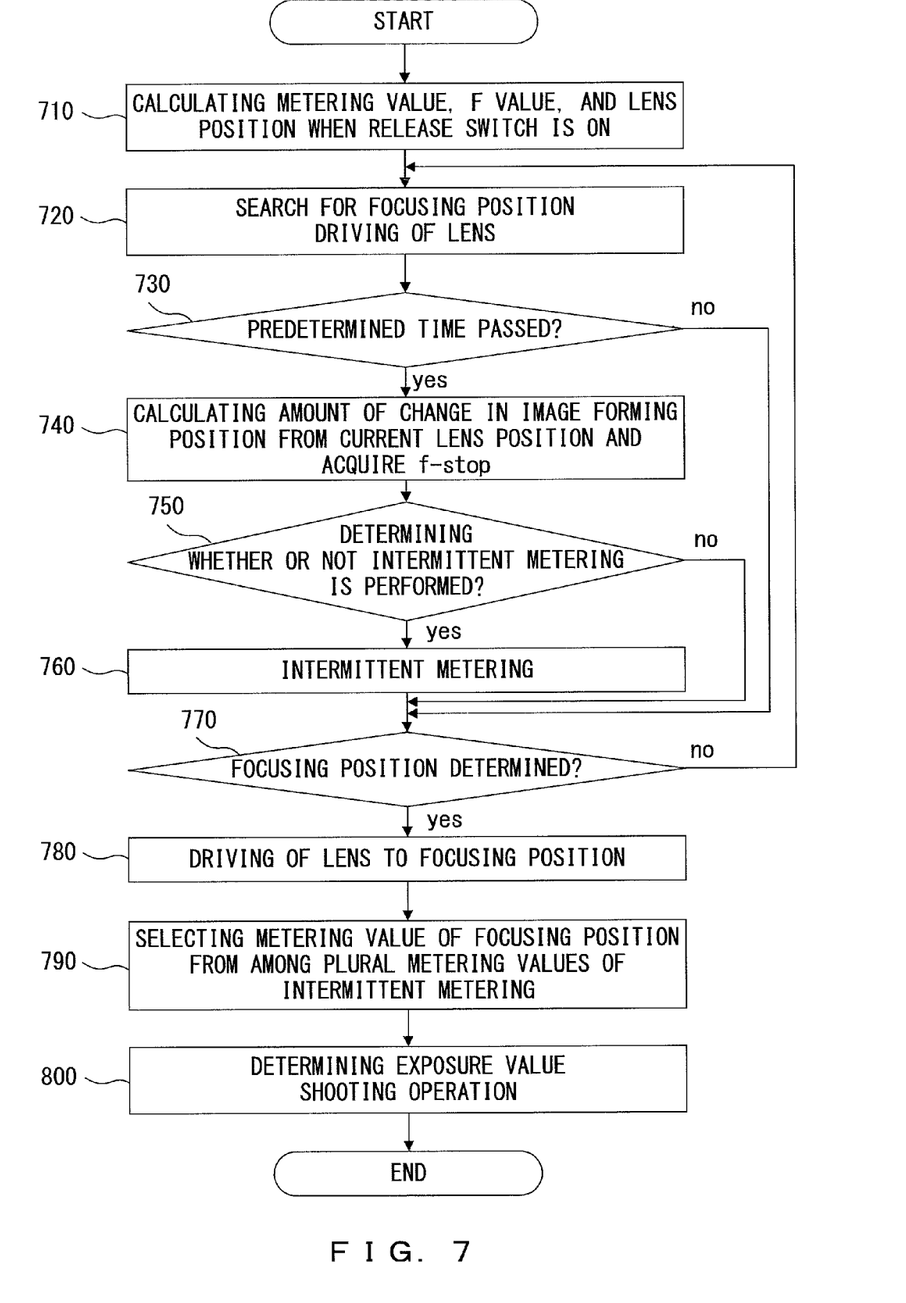
FIG. 7 is a flowchart of an example of the effect of the camera according to another embodiment of the present invention.

FIG. 7 is a flowchart of an example of the effect of the camera according to another embodiment of the present invention.

Steps 710 through 720 are similar to steps 510 through 520 in embodiment 1.

In step 730, it is checked whether or not a predetermined time has passed from the previous metering.

For example, a frame rate is used as a value indicating how many frames of images per second can be displayed in real time from the output of the image pickup device 111. When 60 frames per second are displayed, it is represented by a frame rate of 60 fps.

Further, when it is checked whether or not the metering is performed every two frames, a check is performed once every 33.3 ms in step 730. In embodiment 2, for example, the predetermined time is set as 33.3 ms in the description below. When 33.3 ms have passed from the previous metering, control is passed to step 740.

In step 740, the current lens position (lens position information PL) and f-stop (f-stop VA) are acquired. In addition, the amount of change in image forming position ΔPi is calculated from the previous lens position (when the release switch is ON for the first time).

In step 750, as in step 660 in embodiment 1, it is determined whether or not intermittent metering is to be performed from the amount of change in image forming position ΔPi and the f-stop.

When it is necessary to perform intermittent metering, control is passed to step 760. When it is not necessary, control is passed to step 770.

In step 760, metering is performed and the metering value is stored. The amount of change in image forming position ΔPi and the f-stop VA obtained when the metering is performed are stored. The previous metering value is also stored. It is assumed that the metering values of the past 100 metering operations are stored. If intermittent metering is performed 100 times or more, older metering values are discarded by overwriting.

In step 770, it is determined whether or not the focusing position has been determined. If not, control is returned to step 720.

In steps 720 through 770, the lenses (taking lens 210a and the like) continuously operate for the driving of a lens for a search for a focusing position. If the driving of a lens for the search for the focusing position has been completed, control is passed to the next step 780.

In step 780, the driving of a lens to the focusing position is started. Then, control is passed to step 790. In this case, it is not necessary to wait for the completion of the driving of a lens. That is, the processes in and after step 790 are performed concurrently with the driving of a lens to the focusing position.

In step 790, the intermittent metering value corresponding to the amount of change in image forming position ΔPi closest to the amount of change in image forming position ΔPi in the focusing position is selected and read from among the stored data of the metering values of the past 100 intermittent metering operations and the amount of change in image forming position ΔPi, and the read data is used as the metering value to be used in the exposing operation. The amount of change in image forming position ΔPi in the focusing position is calculated from the lens position indicating the focusing position and the previous lens position (when the release switch is ON for the first time).

In step 800, the actual shooting operation is performed using the intermittent metering value read in step 790.

The control sequence corresponding to the flowchart in FIG. 7 is described below with reference to FIGS. 8, 9, and 10.

Figure 8:
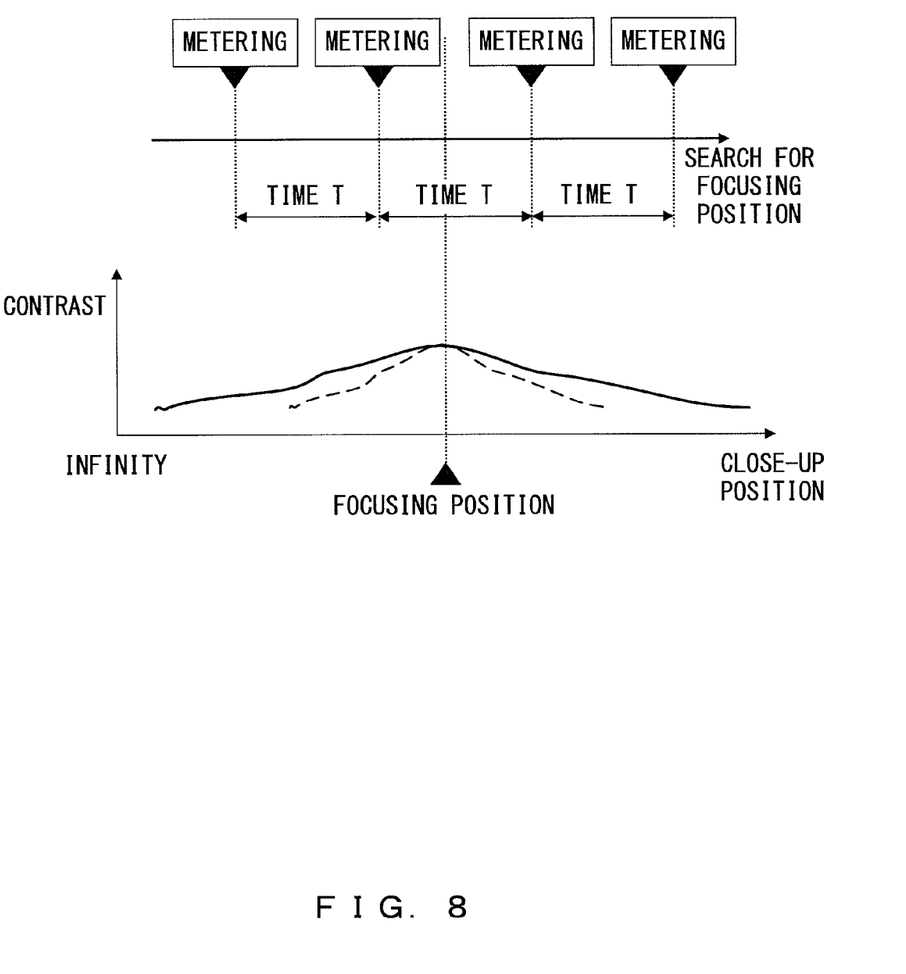
FIG. 8 is a timing chart for explaining the technical problem of the prior art.

FIG. 8 is a timing chart for explaining the technical problem of the prior art.

Figure 9:
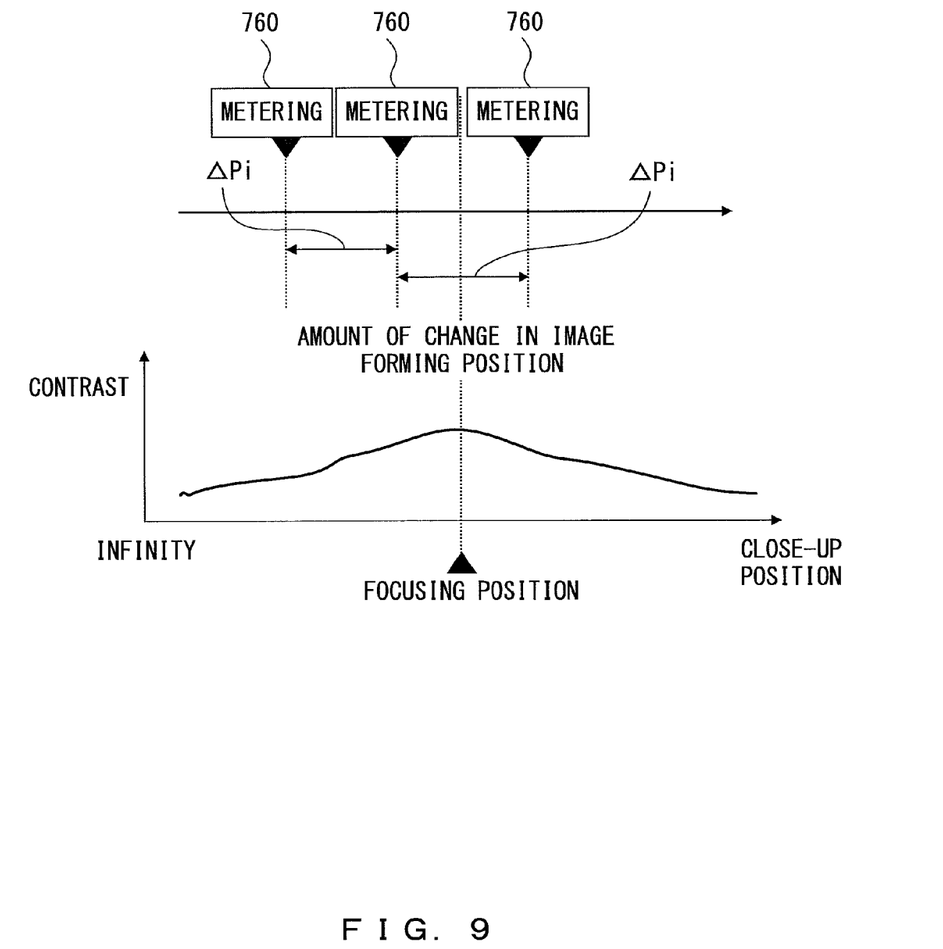
FIG. 9 is a timing chart for explaining the effect of the camera according to another embodiment of the present invention.

FIG. 9 is a timing chart for explaining the effect of the camera according to another embodiment of the present invention.

Figure 10:
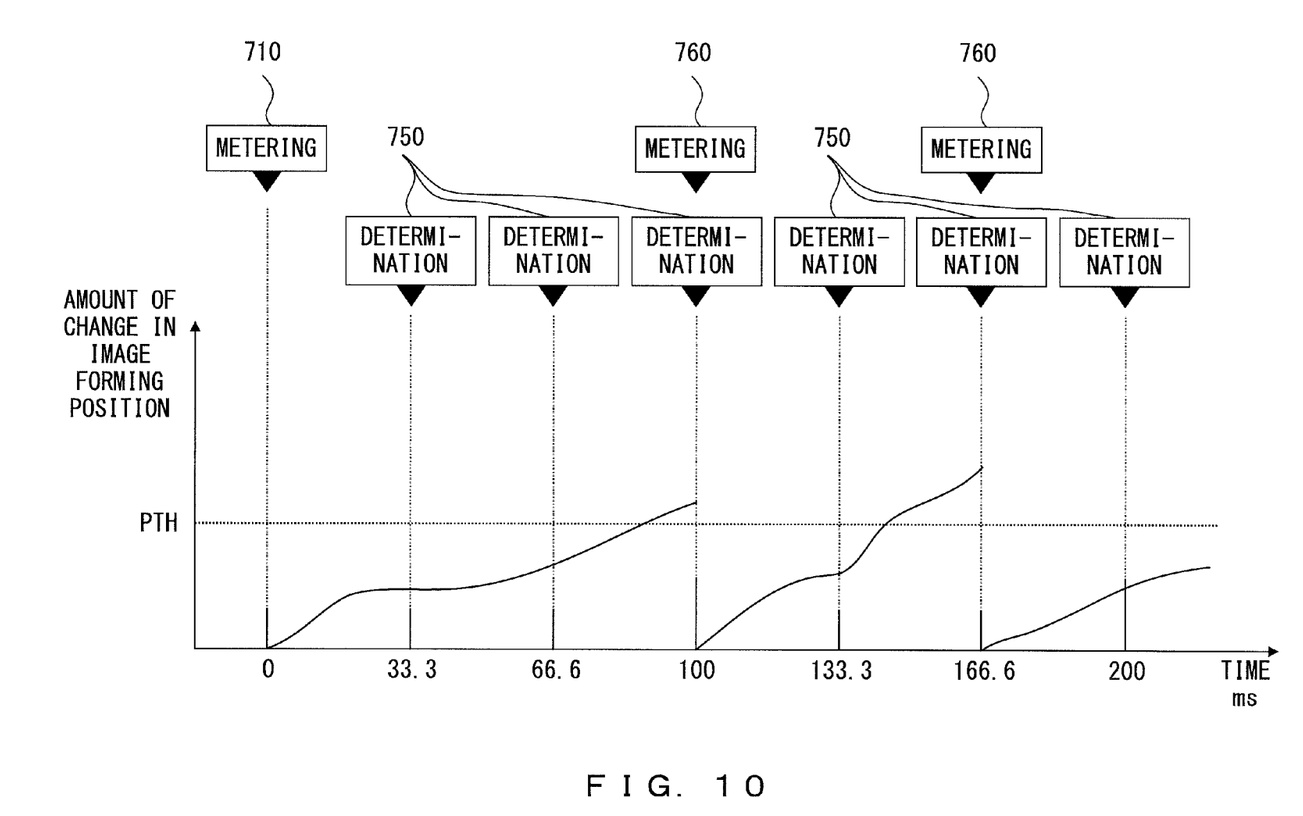
FIG. 10 is a timing chart for explaining the effect of the camera according to another embodiment of the present invention.

FIG. 10 is a timing chart for explaining the effect of the camera according to another embodiment of the present invention.

In the prior art illustrated in FIG. 8, the metering operation is performed in a predetermined period or for a predetermined frame regardless of the stopping or driving of a lens, and a metering value is stored. After determining the focusing position, the metering value corresponding to the lens position closest to the focusing position is selected.

The relationship between the contrast and the lens position depends on the optical condition of the lens as indicated by the solid line and the broken line in FIG. 8, and the curve changes depending on the position of the same lens.

As indicated by the broken line, when the lens condition resembles a steep curve, the change in the out-of-focus level is large, and can reduce the metering accuracy because of the large difference in out-of-focus level between the shooting operation and the metering operation unless the metering interval is short.

On the other hand, when the lens condition resembles the curve of the solid line, it is not necessary to shorten the metering interval, but the time that passes after the focusing position is achieved is longer than in the case of the lens condition indicated by the broken line so as to confirm the contrast peak when the focusing position is searched for, and it is necessary to store a number of metering values for a long time.

That is, to maintain the metering accuracy on both lenses having the different characteristics indicated by the solid line and the broken line in FIG. 8, a technical problem arises wherein it is necessary to shorten the metering interval and store data for a long time.

On the other hand, according to embodiment 2 illustrated in the flowchart in FIG. 7, the intermittent metering is performed at the intervals of amount of change in image forming position ΔPi, corresponding to the above-mentioned threshold PTH=f-stop during metering×determination coefficient, as illustrated in FIG. 9. The further sequence is exemplified in detail in FIG. 10.

In the present embodiment 2, it is determined whether or not the intermittent metering in step 750 is performed at the intervals of 33.3 ms, and whether the intermittent metering is performed when the amount of change in image forming position ΔPi exceeds the threshold PTH, as illustrated in FIG. 10.

The vertical axis in FIG. 10 indicates the amount of change in image forming position ΔPi, and the horizontal axis indicates the time. At the time of 100 ms from the first metering, intermittent metering is performed when the amount of change in image forming position ΔPi exceeds the threshold PTH. Afterwards, the curve indicates the amount of change in image forming position ΔPi from the image forming position during the metering at 100 ms, and indicates the amount of change in image forming position ΔPi indicating the difference from the image forming position Pi after passing 100 ms at the time when 166.6 ms from the first metering exceeds the threshold PTH and the intermittent metering is performed.

With the configuration above, in the case of embodiment 2, wasteful metering is not performed during the driving of a lens for the AF, thereby reducing the storage for the metering value and the calculation load to the minimum values.

Since the metering is completed during the driving of a lens of the AF, it is also not necessary to perform re-metering (required time Δt) after the completion of the movement to the focusing position of the lens as illustrated in FIG. 6, thereby shortening the release time lag Tr.

The control in embodiments 1 and 2 can be switched depending on the AF mode and the optical conditions of a lens. Otherwise, the switch can be made in accordance with the image pickup operations (frame rate, shooting mode, etc.).

In each embodiment above, the amount of change in image forming position ΔPi is for example calculated by multiplying the amount of change in lens position by a conversion coefficient, but the present invention is not limited to this method.

That is, when the TTL phase difference AF system is applied, the image forming position Pi of a subject image corresponding to the metering point can be directly detected. Therefore, the determination of the re-metering can be made by comparing the detected image forming position Pi with the threshold PTH=f-stop during metering×determination coefficient.

In this case, the arithmetic operations for the lens position and the lens data communication of the conversion coefficient and the like from the L μ com 201 to the B μ com 101 can be omitted, thereby reducing the load and realizing a high-speed operation using simple processes.

As described above, according to each embodiment of the present invention, the time required to perform the metering process can be reduced and the release time lag can be shortened for the camera performing metering and autofocusing the output of an image pickup device.

It is obvious that the present invention is not limited to the above-mentioned configurations of the embodiments above, and variations can be applied within the scope of the gist of the present invention.

What is claimed is:

1. A camera, comprising:
   a taking lens forming an image from light of a subject and including a diaphragm unit limiting luminous flux which passes through the taking lens;
   an image pickup unit converting the image formed by the taking lens into an electric signal;
   a subject brightness acquisition unit acquiring brightness information of the subject on the basis of output of the image pickup unit;
   a control unit controlling exposure according to the brightness information acquired by the subject brightness acquisition unit, and controlling the diaphragm unit;
   a position detection unit detecting a position of a focus adjustment lens group of the taking lens; and
   a storage unit storing the position of the focus adjustment lens group detected by the position detection unit when the subject brightness acquisition unit acquires the brightness information, wherein
   the control unit determines whether or not the brightness information is to be acquired again by the subject brightness acquisition unit on the basis of (i) the current position of the focus adjustment lens group detected by the position detection unit and (ii) the position of the focus adjustment lens group detected by the position detection unit when the subject brightness acquisition unit previously acquired the brightness information and stored in the storage unit, by
      (1) comparing (i) a value corresponding to a difference between the current position of the focus adjustment lens group and the position of the focus adjustment lens group when the subject brightness acquisition unit previously acquired the brightness information and stored in the storage unit with (ii) a threshold based on an f-stop of the diaphragm unit, to determine whether or not the value is larger than the threshold, and
      (2) responsive to a determination that the value is larger than the threshold, determining the brightness information is to be acquired again by the subject brightness acquisition unit, and otherwise, responsive to a determination that the value is not larger than the threshold, controlling exposure according to the previously acquired brightness information.

2. The camera according to claim 1, further comprising a focus adjustment unit driving the taking lens to match an image forming position of the subject with an image taking surface on the basis of output of the image pickup unit for achieving focus, wherein
   after the focus adjustment unit brings the taking lens into focus, the control unit determines whether or not the brightness information is to be acquired again by the subject brightness acquisition unit.

3. The camera according to claim 1, wherein
   after driving of the focus adjustment lens group by the focus adjustment unit is completed, when the control unit determines that the brightness information is to be acquired again, the control unit allows the subject brightness acquisition unit to acquire the brightness information again.

4. The camera according to claim 2, further comprising:
   a shooting preparing operation direction unit directing a shooting preparing operation; and
   a display unit displaying an acquired subject image based on output of the image pickup unit, wherein
      the control unit allows the image pickup unit to repeatedly operate so as to display the subject image repeatedly acquired by the display unit, and
   starts an operation of the focus adjustment unit at the direction of the shooting preparing operation from the shooting preparing operation direction unit.

5. A camera comprising:
   a taking lens forming an image from light of a subject and including a diaphragm unit limiting luminous flux which passes through the taking lens;
   an image pickup unit converting the image formed by the taking lens into an electric signal;
   a focus adjustment unit driving the taking lens to match an image forming position of the subject with an image taking surface on the basis of output of the image pickup unit for achieving focus;
   a subject brightness acquisition unit acquiring brightness information of the subject on the basis of output of the image pickup unit;
   a control unit controlling exposure according to the brightness information acquired by the subject brightness acquisition unit, and controlling the diaphragm unit; and
   an image forming position change amount calculation unit calculating an amount of change in image forming position from a predetermined image forming position of the taking lens while the taking lens is moved by the focus adjustment unit,
   wherein the control unit (1) determines whether or not the subject brightness acquisition unit will be allowed to acquire the brightness information on the basis of the amount of change in image forming position output by the image forming position change amount calculation unit, (2) makes the subject brightness acquisition unit acquire the brightness information when it is determined the subject brightness acquisition unit will be allowed to acquire the brightness information, (3) stores the brightness information and the amount of change in image forming position corresponding to the acquired brightness information, and (4) selects the brightness information corresponding to the amount of change in image forming position that is closest to the amount of change in image forming position in a focusing state from among the amounts of change in image forming position corresponding to plural pieces of stored brightness information without acquiring the brightness information by the subject brightness acquisition unit when the focusing state is acquired by the focus adjustment unit, by (1) comparing (i) the amount of change in image forming position output by the image forming position change amount calculation unit with (ii) a threshold of an f-stop set by the diaphragm unit, to generate a comparison result, and (2) determining whether or not the subject brightness acquisition unit will be allowed to acquire the brightness information using the comparison result.

6. The camera according to claim 5, wherein
when the amount of change in image forming position exceeds the threshold of the f-stop set by the diaphragm unit, the control unit allows the subject brightness acquisition unit to acquire the brightness information.

7. The camera according to claim 5, wherein
the control unit calculates the amount of change in image forming position based on a conversion coefficient depending on a position of a focus adjustment lens group output by the focus adjustment unit and an optical characteristic of the taking lens.

8. The camera according to claim 5, further comprising:
a shooting preparing operation direction unit directing a shooting preparing operation; and
a display unit displaying an acquired subject image based on an output of the image pickup unit, wherein
the control unit allows the image pickup unit to repeatedly operate to display the subject image repeatedly acquired by the display unit, and starts an operation of the focus adjustment unit at the direction of the shooting preparing operation from the shooting preparing operation direction unit.

9. A metering method for a camera, comprising:
a first step of storing information about a position of a focus adjustment lens group of a taking lens when an image pickup unit forms and acquires brightness information about a subject using the taking lens;
a second step of determining whether or not the brightness information is to be acquired again according to the information about the current position of the focus adjustment lens group detected by a position detection unit and information about the position of the focus adjustment lens group detected by the position detection unit when the subject brightness acquisition unit previously acquired the brightness information and stored in the storage unit, wherein
the second step includes (1) comparing (i) a value of a difference between a current position of the focus adjustment lens group and the position of the focus adjustment lens group when the brightness information is acquired previously with (ii) a threshold based on an f-stop of a diaphragm unit to determine whether or not the value is larger than the threshold, and (2) responsive to a determination that the value is larger than the threshold, acquiring the brightness information again, and otherwise, responsive to a determination that the value is not larger than the threshold, using the previously acquired brightness information in exposure calculation.

10. The method according to claim 9, wherein
in the second step is a step to determine whether or not the brightness information is to be acquired again after the taking lens is brought into focus on the subject by moving a focus adjustment lens group configuring the taking lens.

11. The method according to claim 10, wherein
in the second step, the brightness information is acquired again after the focus adjustment lens group is completely driven when focus is attained.

12. A metering method for a camera, comprising:
a first step of calculating an amount of change in image forming position from a predetermined image forming position of a taking lens during moving of the taking lens;
a second step of determining whether or not brightness information is to be acquired according to the amount of change in image forming position, and, responsive to a determination that the brightness information is to be acquired, acquiring the brightness information and storing the brightness information and the amount of change in image forming position corresponding to acquired brightness information; and
a third step of selecting the brightness information corresponding to the amount of change in image forming position closest to an amount of change in image forming position in a focusing state from among the amounts of change in image forming position corresponding to plural pieces of stored brightness information without acquiring the brightness information when the focusing state of the taking lens is acquired,
wherein the amount of change in image forming position is compared with threshold of an f-stop of a diaphragm unit for limiting luminous flux which passes through the taking lens to generate a comparison result, and
wherein whether or not the brightness information is acquired is determined using the comparison result.

* * * * *